United States Patent [19]

Harada et al.

[11] Patent Number: 4,540,590
[45] Date of Patent: Sep. 10, 1985

[54] PROCESS FOR PRODUCING RAPID-COOKING PASTAS HAVING GOOD KEEPING QUALITY

[75] Inventors: Haruo Harada; Akira Fujiwara; Yoshio Hatanaka; Hironori Iimura, all of Tokyo, Japan

[73] Assignee: Myojo Foods Co., Ltd., Tokyo, Japan

[21] Appl. No.: 564,246

[22] Filed: Dec. 22, 1983

[30] Foreign Application Priority Data

Oct. 31, 1983 [JP] Japan ................................. 58-204457

[51] Int. Cl.$^3$ ........................... A21D 2/00; A23L 1/16
[52] U.S. Cl. .................................... 426/324; 426/407; 426/451; 426/557
[58] Field of Search ................. 426/557, 451, 407, 324

[56] References Cited

FOREIGN PATENT DOCUMENTS 190362 11/1983 Japan .................................... 426/557
2666 1/1984 Japan .................................... 426/557

Primary Examiner—Robert Yoncoskie
Assistant Examiner—Elizabeth A. King
Attorney, Agent, or Firm—Oblon, Fisher, Spivak, McClelland & Maier

[57] ABSTRACT

A mixture of wheat and a suitable amount of water is kneaded to form dough, which is fed into a cylinder and extruded through a die at a pressure of 50 kg/cm$^2$ or higher into an atmosphere having a degree of vacuum of not higher than 650 mmHg. The resulting strands are cut to desired lengths and dried to a moisture content of 26±4%. The dried strands are put in heat-resistant packages, which are sealed and sterilized by heating the contents at a temperature between 70° and 95° C. The resulting pasta can be reconstituted to the ready-to-eat state by boiling for about 4 minutes.

11 Claims, 4 Drawing Figures

PROCESS FOR PRODUCING RAPID-COOKING PASTAS HAVING GOOD KEEPING QUALITY

BACKGROUND OF THE INVENTION

The present invention relates to a process for producing palatable rapid-cooking pastas having good keeping quality with a fairly high moisture content.

The term "pastas" as used in this specification means starchy food preparations made from semolina, such as macaroni, spaghetti, noodles and ravioli.

Macaroni and spaghetti dried to a moisture content of 12.5% or less, for example, 12% are manufactured and sold in great quantities. Boiled macaroni and spaghetti are also manufactured for consumption both at restaurants and at home. Completely dried pastas have a very good keeping quality, but they require as long as 15 minutes to be boiled. On the other hand, already boiled pastas can be cooked in a very short period, but then they have a very poor keeping quality and find outlets in an extremely limited range of the commercial market.

Attempts have been made to provide boiled pastas with both good keeping quality and a rapid-cooking property by sterilizing them with a retort. This method is effective for reducing the cooking time, but the retorted product does not have an adequately long keeping quality and loses its body or becomes slack during extended storage.

Refrigerating or freezing raw pastas is effective in reducing the cooking time to less than 10 minutes. This is shorter than that required for cooking dried pastas but is not short enough to give the product credit for being called "rapid-cooking" pastas. Furthermore, this method requires a special refrigerator or freezer and is not simple to operate.

Therefore, it has long been desired to develop pastas that can be stored effectively for an extended period at room temperature without a special apparatus and which can be cooked rapidly within a period of only about 4 minutes and which yet are as palatable as completely dried pastas.

SUMMARY OF THE INVENTION

The primary object of the present invention is to provide a process for producing pastas that can be stored effectively for an extended period at room temperature without a special apparatus and which can be cooked rapidly within a short period and which yet are as palatable as conventional completely dried pastas.

The "completely dried pastas" as used in this specification means those which are produced by the following procedures: (1) kneading semolina with a suitable amount of water to form dough; (2) feeding the dough into a cylinder and extruding it through a die at a predetermined pressure into a substantially vacuum atmosphere; and (3) drying the resulting strands to a moisture content of 12.5% or less, typically about 12%.

BRIEF DESCRIPTION OF THE DRAWINGS

Further objects and features of the present invention will become apparent by reading the following description taken in conjunction with the attached drawings, in which.

DETAILED DESCRIPTION OF THE INVENTION

Figure 1:
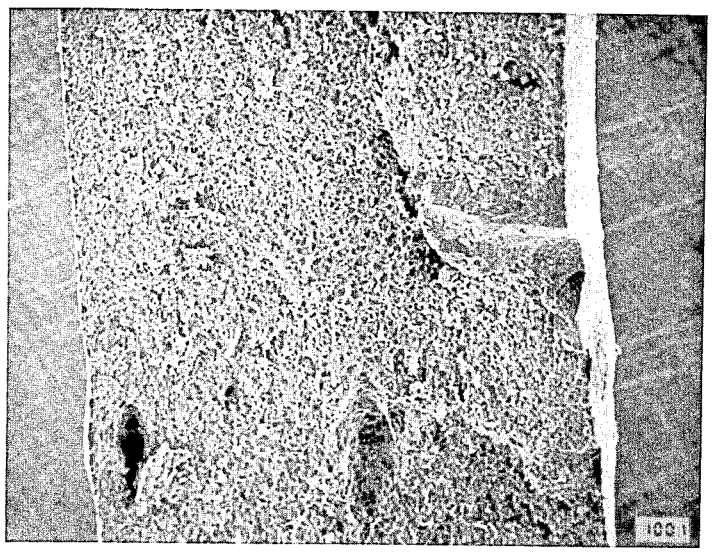
FIG. 1 is an electron micrograph showing in cross section one strand of the rapid-cooking spaghetti prepared in Example 4 of the present invention (magnification 50×)

The process for producing the rapid-cooking pastas according to the present invention proceeds as follows. First, semolina is kneaded with a suitable amount of water to form dough. The dough is fed into a cylinder and extruded through a die at a pressure of 50 kg/cm$^2$ or more into an atmosphere having a degree of vacuum of 650 mmHg or lower. The die is so designed as to permit the formation of a bundle of discrete strands. The term "degree of vacuum" as used in this specification has a different meaning than it is generally understood to have; a pressure equal to one atmosphere is expressed as 0 mmHg and a complete vacuum is represented by 760 mmHg. If the pressure at which the dough is extruded through the die is increased from 50 kg/cm$^2$ to a value between 60 and 70 kg/cm$^2$, and degree of vacuum must be correspondingly decreased from 650 mmHg to a value between 630 and 610 mmHg.

The upper limit of the pressure at which the dough is extruded through the die is the maximum pressure that can be applied by the press used to extrude the dough. The preferred range is from 65 to 90 kg/cm$^2$, and the range of 75 to 85 kg/cm$^2$ is most preferred.

The degree of vacuum in the atmosphere into which dough is extruded may be equal to one atmosphere. Generally, the range of 640 to 400 mmHg is preferred, and the range of 630 to 540 mmHg is most preferred.

The point in time of effecting degasfication is not critical to the purposes of the present invention, and it may be effected during the kneading step, extrusion step or between these two steps. Degasification may also be effected at more than one point of time.

As a result of yearlong research on the development of palatable rapid-cooking pastas, the present inventors have found that if a good balance is struck between the pressure as applied by the press and the degree of vacuum in the atmosphere into which the dough is extruded, the resulting pastas are provided with a suitable degree of porosity, which contributes to a great reduction in the time required for boiling the product. The present invention has been accomplished on the basis of this finding.

The strands from the extruded dough are then cut to desired lengths and partially dried to a moisture content of 26±4%. If the moisture content of the strands is less than 22%, pastas as the final product break easily and do not have a high commercial value. Furthermore, the pastas require a prolonged cooking time. If the moisture content exceeds 30%, the strands heated for sterilization may stick to each other. Another disadvantage is their low keeping quality. The most preferred range of moisture content is from about 24% to about 29%.

The partially dried strands are continuously fed into a bucket, from which they are transferred into heat-resistant packages, which are sealed and subjected to sterilization with a heating medium that holds the strands at a temperature between 70° and 95° C. for 10 to 40 minutes. If the temperature of the strands exceeds 100° C., the water in the strands boils to impair its quality. If the temperature of the strands is less than 70° C., the desired sterilization is not achieved. This heat treatment has the secondary object of giving the final product a property of increased resilience to the bite of the person eating it when cooked.

The keeping quality of the pastas produced according to the present invention can be further improved by incorporating specific additives in the mixture of semolina and water. For example, at least one additive selected from the group consisting of alcohols, propylene glycol, organic acids, glycine and sodium chloride may be added to the mixture of semolina with a suitable amount of water. The respective components are well kneaded to form dough, which is fed into a cylinder and extruded through a die at a pressure of 50 kg/cm$^2$ or more into an atmosphere having a degree of vacuum of not higher than 650 mmHg. The resulting strands are cut to predetermined lengths, partially dried to a moisture content of 26±4% and put into heat-resistant packages. The packages are then sealed and sterilized by heating the strands at a temperature between 70° and 95° C. In this way, pastas having a further improved keeping quality can be produced.

The effect of the above-mentioned additives is achieved whether they are incorporated individually or in combination. If desired, they may be used together with liquid egg, which is effective in introducing an increased porosity and thereby reducing the boiling period.

For the purpose of providing a better keeping quality, an alcohol is added in an amount ranging from 0.5 to 4.0 wt %. If less than 0.5 wt % of the alcohol is used, the desired keeping quality is not obtained. Using more than 4.0% of alcohol impairs not only the handling properties of the mixture but also the cosmetic quality and palatability of the final product.

Propylene glycol is added in an amount ranging from 1.0 to 4.0 wt %. If less than 1.0 wt % of propylene glycol is used, no improvement in the keeping quality is achieved. If more than 4.0 wt % of propylene glycol is used, an unpalatable astringent product results.

The organic acid (e.g. malic acid or lactic acid) is preferably used in an amount ranging from 0.1 to 0.3 wt %. If 0.3 wt % is exceeded, an unpalatable sour product results. If less than 0.1 wt % of the organic acid is used, no improvement in the keeping quality is achieved.

Glycine is preferably added in an amount ranging from 0.1 to 1.0 wt %. If less than 0.1 wt % of glycine is used, no improvement in the keeping quality is attained. If more than 1.0 wt % of glycine is used, an odorous product results.

Sodium chloride is added in an amount ranging from 0 to 4 wt %, preferably from 1 to 3 wt %. The most preferred amount of sodium chloride is 2 wt %. Sodium chloride is also effective in providing pastas having a further improved keeping quality. However, using more than 4 wt % of sodium chloride may impair the palatability of the final product.

Liquid egg is most preferably used in an amount ranging from 1.0 to 10.0 wt %. Using more than 10.0 wt % of liquid egg impairs not only the handling properties of the mixture but also the flavor of the final product.

The advantages of the present invention are hereunder described in greater detail by reference to working examples which are given here for illustrative purposes only.

EXAMPLE 1

A mixture of durum semolina and wheat flour (1:1) was blended with 28 wt % of water in a mixer for 15 minutes. (The semolina usually has a moisture content of about 14%. Thus, the moisture content of the resulting dough exceeds 30%.) The resulting dough was then molded through a die having 1.9 mm$^\phi$ holes at a pressure of 80 kg/cm$^2$ into an atmosphere having a degree of vacuum of 530 mmHg. The resulting strands were cut to shorter lengths having a predetermined weight and dried with cold air until the moisture content decreased to about 26%. The dried strands were put into heat-resistant packages, which were sealed and sterilized by steaming the strands at ca. 80° C. for 20 minutes. The steamed strands were cooled to room temperature to obtain rapid-cooking spaghetti having the desired keeping quality.

EXAMPLE 2

A mixture of durum semolina and wheat flour (1:1) was blended with a mixture of 26 wt % water and 2.0 wt % ethanol in a mixer for 15 minutes. The resulting dough was then molded through a die having 1.9 mm$^\phi$ holes at a pressure of 70 kg/cm$^2$ into an atmosphere having a degree of vacuum of 570 mmHg. The resulting strands were cut to shorter lengths having a predetermined weight, and subsequently processed as in Example 1 to obtain rapid-cooking spaghetti having the desired keeping quality.

EXAMPLE 3

A mixture of durum semolina and wheat flour (1:1) was blended with a mixture of 27 wt % water, 1.0 wt % ethanol and 0.2 wt % DL-malic acid in a mixer for 15 minutes. The resulting dough was then molded through a die having 1.9 mm$^\phi$ holes at a pressure of 90 kg/cm$^2$ into an atmosphere having a degree of vacuum of 520 mmHg. The resulting strands were cut to shorter lengths having a predetermined weight, and dried with cold air until the moisture content decreased to about 26%. The dried strands were put into heat-resistant packages, which were sealed and sterilized by steaming the strands at 70° C. for 40 minutes. The streamed strands were cooled to room temperature to obtain rapid-cooking spaghetti having the desired keeping quality.

EXAMPLE 4

A mixture of durum semolina and wheat flour (1:1) was blended with a mixture of 23 wt % water, 1.0 wt % ethanol, 2.0 wt % propylene glycol, 3.0 wt % liquid egg and 2.0 wt % NaCl in a mixer for 15 minutes. The resulting dough was then molded through a die having 1.9 mm$^\phi$ holes at a pressure of 80 kg/cm$^2$ into an atmosphere having a degree of vacuum of 540 mmHg. The resulting strands were cut to shorter lengths having a predetermined weight, and subsequently processed as in Example 1 to obtain rapid-cooking spaghetti having the desired keeping quality.

EXAMPLE 5

A mixture of durum semolina and wheat flour (1:1) was blended with a mixture of 26 wt % water, 2.0 wt % propylene glycol, 0.5 wt % glycine and 2.0 wt % NaCl in a mixer for 15 minutes. The resulting dough was then molded through a die having 1.9 mm$^\phi$ holes at a pressure of 80 kg/cm$^2$ into an atmosphere having a degree of vacuum of 530 mmHg. The resulting strands were cut to shorter lengths having a predetermined weight, and subsequently processed as in Example 1 to obtain rapid-cooking spaghetti having the desired keeping quality.

COMPARATIVE EXAMPLE

Figure 4:
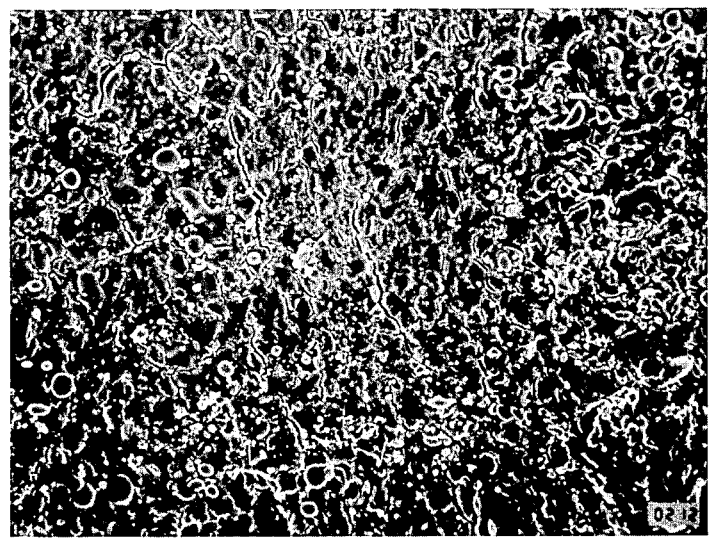
FIG. 4 is an electron micrograph showing a partially enlarged section of FIG. 2 (magnification 200×).

A mixture of durum semolina and wheat flour (1:1) was blended with 28 wt % water in a mixer for 15 minutes. The resulting dough was then molded through a die having 1.9 mm$^\phi$ holes at a pressure of 85 kg/cm$^2$ into an atmosphere having a degree of vacuum of 750–760 mmHg. The resulting strands were dried to a moisture content of about 12% in a dryer conventionally used to manufacture completely dried spaghetti. The dried strands were then cut to shorter lengths. Electron micrographs of a cross section of one strand of the spaghetti are shown in FIG. 2 (magnification 50×) and FIG. 4 (magnification 200×).

Figure 2:
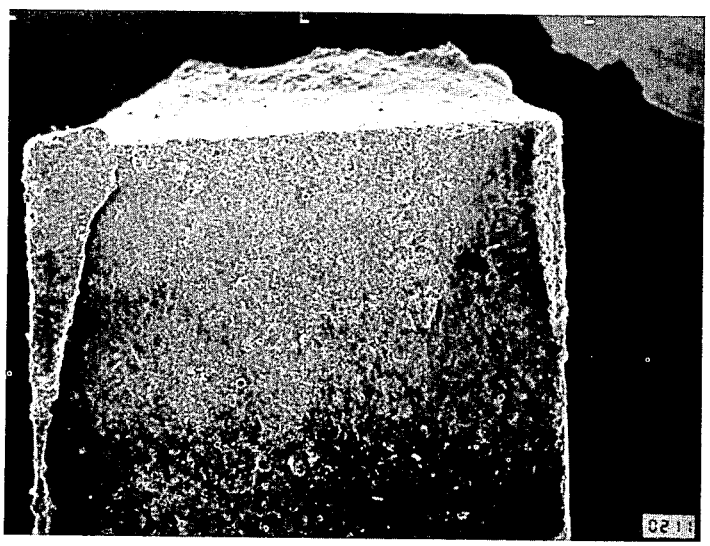
FIG. 2 is an electron micrograph showing in cross section one strand of the dried spaghetti prepared by the conventional technique (magnification 50×)
Figure 3:
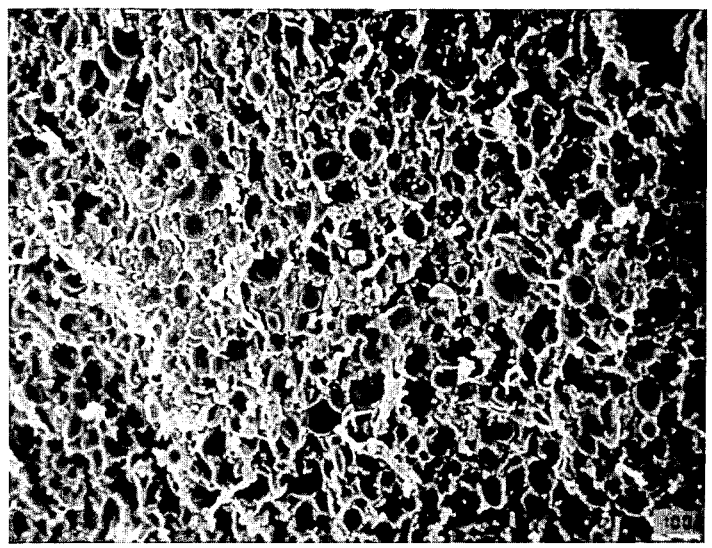
FIG. 3 is an electron micrograph showing a partially enlarged section of FIG. 1 (magnification 200×)

Comparison between FIG. 2 and FIG. 1 which is an electron micrograph (magnification 50×) of a cross section of one strand of the spaghetti produced in Example 4 according to the present invention shows that the product of the present invention is more porous than the comparative sample. Comparison of FIG. 4 with FIG. 3 which is an electron microgrph (magnification 200×) of an enlarged section of one strand of the spaghetti produced in Example 4 shows that in the comparative sample, starch granules are deformed whereas they remain intact in the product of Example 4.

EXPERIMENT

Spaghetti products were prepared as in Example 1 with one or more additives selected from among alcohols, propylene glycol, organic acids, glycine and sodium chloride, as indicated in Table 1. The samples were then stored at a constant temperature of 30° C. for the periods shown in Table 1. The sample described as "No additive (unsterilized)" in Table 1 was prepared by the procedure of Example 1 except that no sterilization with steam was effected.

As is clear from Table 1, the control prepared from only an unsterilized mixture of wheat and water had a shorter keeping quality than the samples of the present invention. The sample containing 2.0 wt % of ethanol, and those containing 1.0 wt % ethanol, 2.0 wt % propylene glycol and 2.0 wt % NaCl withstood the 90-day storage without any deterioration in their palatability. Obviously, no commercial spaghetti available on the market has a keeping quality that is comparable to that of the products of the present invention.

The rapid-cooking spaghetti products prepared in Examples 1 and 4 according to the present invention and two controls, one being prepared as in Example 1 without sterilization and the other being completely dried according to the technique used in the Comparative Sample, were compared with respect to the palatability and the speed of reconstitution with boiling water. The results are shown in Table 2.

TABLE 2

| Sample | Palatability | Speed of reconstitution |
|---|---|---|
| Control 1 (unsterilized sample of Example 1) | C | 4 minutes and 30 seconds |
| Sample of Example 1 | B | 4 minutes and 30 seconds |
| Sample of Example 4 | (A) | 4 minutes |
| Control 2 (completely dried spaghetti, 1.9 mm$^\phi$ strands) | A | 13 minutes |

Index of palatability rating:
A . . . very resilient to the bite
(A) . . . better than B and close to A
B . . . resilient to the bite
C . . . less resilient to the bite than B A sample of spaghetti was prepared as in Example 4. Another sample was prepared in the same manner except that it was not sterilized. A third sample was prepared as in the Comparative Example. The three samples were reconstituted with boiling water and their physical properties were determined with a Tensipressor (the trademark for a rheometer manufactured by Taketomo Denki K.K.). The results are shown in Table 3.

TABLE 3

| Sample | compressive strength (g/mm$^2$) | tensile strength (g/mm$^2$) | elongation (mm) | shear strength (g/mm$^2$) |
|---|---|---|---|---|
| Unsterilized sample of Example 4 | 46.53 | 18.10 | 14.38 | 31.31 |
| Sterilized sample of Example 4 | 51.11 | 21.07 | 15.37 | 34.61 |
| Dried spaghetti of Comparative | 53.52 | 22.82 | 15.40 | 37.03 |

TABLE 1

| Additives (in percent by weight of sheat) | Days stored ||||||||||| 
|---|---|---|---|---|---|---|---|---|---|---|---|
| | 2 | 4 | 6 | 10 | 15 | 20 | 30 | 45 | 60 | 75 | 90 |
| No additive (unsterilized) (consisting of only wheat and water) | Δ | X | | | | | | | | | |
| No additive (sterilized) | — | — | — | Δ | Δ | X | | | | | |
| ethanol (2.0%) | — | — | — | — | — | — | — | — | — | — | — |
| ethanol (1.0%), glycine (0.5%) | — | — | — | — | — | — | — | — | — | — | Δ |
| ethanol (1.0%), DL-malic acid (0.2%) | — | — | — | — | — | — | — | — | — | Δ | Δ |
| ethanol (1.0%), lactic acid (0.2%) | — | — | — | — | — | — | — | — | — | Δ | X |
| ethanol (1.0%), propylene glycol (2.0%), NaCl (2.0%) | — | — | — | — | — | — | — | — | — | — | — |
| ethanol (1.0%), propylene glycol (2.0%), liquid egg (3.0%), NaCl (2.0%) | — | — | — | — | — | — | — | — | — | — | — |
| propylene glycol (2.0%), glycine (0.5%), NaCl (2.0%) | — | — | — | — | — | — | — | — | — | — | Δ |
| propylene glycol (2.0%), DL-malic acid (0.2%), NaCl (2.0%) | — | — | — | — | — | — | — | — | Δ | Δ | X |
| Glycine (0.5%), NaCl (2.0%) | — | — | — | — | — | — | — | — | — | Δ | X |
| DL-malic acid (0.2%), NaCl (2.0%) | — | — | — | — | — | — | — | — | Δ | Δ | X |

Index of rating:
—: normal,
Δ: some change occurred as typified by malodor,
X: putrefied

TABLE 3-continued

| Sample | compressive strength (g/mm²) | tensile strength (g/mm²) | elongation (mm) | shear strength (g/mm²) |
|---|---|---|---|---|
| Example | | | | |

Table 2 shows that the sterilized sample of Example 1 has the same speed of reconstitution as that for the unsterilized sample. However, the former is more palatable than the latter. The sample of Example 4 is as palatable as the completely dried spaghetti prepared in the Comparative Example. However, the former can be reconstituted with boiling water three times as fast as the latter. Table 3 shows that the physical properties of the sterilized sample are better than those of the unsterilized sample, and are close to those of the conventional dried spaghetti.

What is claimed is:

1. A process for preparing rapid-cooking pastas having good keeping quality, said process comprising the following steps:
    kneading a mixture of wheat and a sufficient amount of water to form dough;
    feeding the dough in a cylinder and extruding the same through a die at a pressure of 50 kg/cm² or more into an atmosphere having a degree of vacuum of not more than 650 mmHg;
    cutting the resulting strands to desired lengths;
    drying the strands until the moisture content is reduced to 26±4%;
    placing the dried strands in heat-resistant packages;
    sealing the packages; and
    sterilizing the strands by heating them at a temperature between 70° and 95° C.

2. A process according to claim 1 wherein the dough is extruded at a pressure of 65–90kg/cm².

3. A process according to claim 2 wherein the dough is extruded at a pressure of 75–85kg/cm².

4. A process according to claim 1 wherein the dough is extruded into an atmosphere having a degree of vacuum of 640–400 mmHg.

5. A process according to claim 4 wherein the dough is extruded into an atmosphere having a degree of vacuum of 630–540 mmHg.

6. A process according to claim 1 wherein the strands are dried to a moisture content in the range of about 24 to about 29%.

7. A process according to claim 1 wherein the mixture further contains at least one additive selected from the group consisting of 0.5–4.0 wt % of an alcohol, 1.0–4.0 wt % of propylene glycol, 0.1–0.3 wt % of an organic acid, 0.1–1.0 wt % of glycine and 0–4 wt % of sodium chloride, all percents being based on the weight of the wheat.

8. A process according to claim 7 wherein the additive is ethanol.

9. A process according to claim 7 wherein the additive acid is malic acid or lactic.

10. A process according to claim 7 wherein sodium chloride is used in an amount of 1–3 wt %.

11. A process according to claim 10 wherein sodium chloride is used in an amount of 2 wt %.

* * * * *